(12) United States Patent
Kwok et al.

(10) Patent No.: US 9,426,381 B1
(45) Date of Patent: *Aug. 23, 2016

(54) METHOD AND/OR APPARATUS FOR IMPLEMENTING HIGH DYNAMIC RANGE IMAGE PROCESSING IN A VIDEO PROCESSING SYSTEM

(71) Applicant: Ambarella, Inc., Santa Clara, CA (US)

(72) Inventors: Wilson Kwok, Santa Clara, CA (US); Leslie D. Kohn, Saratoga, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/925,225

(22) Filed: Oct. 28, 2015

Related U.S. Application Data

(63) Continuation of application No. 12/824,731, filed on Jun. 28, 2010, now Pat. No. 9,204,113.

(51) Int. Cl.
| | |
|---|---|
| *H04N 7/12* | (2006.01) |
| *H04N 11/02* | (2006.01) |
| *H04N 19/44* | (2014.01) |
| *H04N 5/235* | (2006.01) |
| *H04N 9/74* | (2006.01) |
| *H04N 7/52* | (2011.01) |

(52) U.S. Cl.
CPC .......... *H04N 5/2355* (2013.01); *H04N 5/2353* (2013.01); *H04N 9/74* (2013.01); *H04N 7/12* (2013.01); *H04N 7/52* (2013.01)

(58) Field of Classification Search
CPC . H04N 7/50; H04N 7/26941; H04N 21/2365; H04N 21/4347; H04N 21/23608
USPC ........................ 375/240.01, 240.25, 240.26
See application file for complete search history.

(56) References Cited

U.S. PATENT DOCUMENTS

| | | | |
|---|---|---|---|
| 7,092,019 B1 | 8/2006 | Ogata et al. | 348/263 |
| 2005/0226526 A1 | 10/2005 | Mitsunaga | 382/274 |
| 2006/0033823 A1 | 2/2006 | Okamura | 348/254 |
| 2007/0132864 A1 | 6/2007 | Tsuruoka | 348/241 |
| 2008/0094486 A1 | 4/2008 | Fuh et al. | 348/229.1 |
| 2009/0231473 A1 | 9/2009 | Shimoozono et al. | 348/246 |
| 2009/0268963 A1 | 10/2009 | Kang et al. | 382/168 |
| 2010/0073731 A1 | 3/2010 | Takei et al. | 358/443 |
| 2010/0142847 A1 | 6/2010 | Moon et al. | 382/274 |
| 2010/0150473 A1 | 6/2010 | Kwon et al. | 382/284 |
| 2010/0157078 A1 | 6/2010 | Atanassov et al. | 348/222.1 |
| 2010/0310189 A1 | 12/2010 | Wakazono et al. | 382/258 |

OTHER PUBLICATIONS

Tom Mertens et al., "Exposure Fusion", Oct. 29-30, 2007, 16 pages.

*Primary Examiner* — Jamie Atala
*Assistant Examiner* — On S Mung
(74) *Attorney, Agent, or Firm* — Christopher P. Maiorana, PC

(57) ABSTRACT

An apparatus comprising a scaling circuit, a luma circuit and a blending circuit. The scaling circuit may generate a plurality of scaled frames in response to a first plurality of frames generated by a sensor. The first plurality of frames may have a first exposure. The luma circuit may generate an average luminance value for each of a plurality of processed pixels in each of a second of the plurality of frames generated by the sensor. The second of the plurality of frames may have a second exposure and each of the average luminance values is calculated based on a plurality of neighboring pixels in a neighborhood of the processed pixel.

19 Claims, 4 Drawing Sheets

METHOD AND/OR APPARATUS FOR IMPLEMENTING HIGH DYNAMIC RANGE IMAGE PROCESSING IN A VIDEO PROCESSING SYSTEM

This application relates to U.S. Ser. No. 12/824,731, filed Jun. 28, 2010, now U.S. Pat. No. 9,204,113, which is incorporated by reference in its entirety.

FIELD OF THE INVENTION

The present invention relates to image processing generally and, more particularly, to a method and/or apparatus for implementing high dynamic range image processing in a video processing system.

BACKGROUND OF THE INVENTION

Dynamic range is the ratio between the maximum and minimum values of a physical measurement. The dynamic range of real-world scenes can be quite high (i.e., ratios of 100,000:1 are common in the natural world). The human eye is able to perceive such high dynamic ranges in real-world scenes. Dynamic range in an image processing system is considered the ratio between the brightest and darkest parts of a particular scene or picture. For a camera sensor environment, dynamic range is defined as the ratio between the largest possible measurement and the smallest possible measurement the sensor can generate. The largest measurement is limited by the physical pixel well size. The smallest measurement is limited by the physical noise floor. Raw pixel values from a camera sensor are proportional to the amount of light measured. In this sense, raw images from a camera sensor are scene-referred, accurately representing (within the dynamic range capability of the sensor) the original light values captured for the scene. Typical dynamic range for a camera sensor in a conventional consumer device is up to around 1000:1.

There can be a gap of several orders of magnitude in dynamic range difference between human eye perception of a natural scene and what a conventional camera sensor is capable of capturing and representing. Conventional camera images often lack detail in the shadow and/or highlight regions present in natural scenes compared with similar scenes directly perceived by the human eye.

High dynamic range (HDR) imaging is a set of techniques sometimes used in still cameras. Conventional still image sensors can use HDR techniques to form images that show a greater dynamic range of luminance between the lightest and darkest areas when compared with conventional camera photographic approaches. HDR techniques provide images more like what the human eye would see. The HDR process involves combining more than one image captured by a conventional camera sensor of a given scene. Conventional camera sensors can only capture low dynamic range (LDR) or standard dynamic range (SDR) images. HDR techniques produce a final low dynamic range image that shows tonal details of the entire dynamic range captured by the different exposures.

HDR techniques produce a final low dynamic range image as a standard camera image file, typically an 8-bit per color channel RGB image that is JPEG compressed. The final output has limited dynamic range since standard display devices only reproduce a low range (around 100 to 200:1). For paper prints, the range is even lower.

It would be desirable to implement a method and/or apparatus for high dynamic range image processing in a video image processing system.

SUMMARY OF THE INVENTION

The present invention concerns an apparatus comprising a scaling circuit, a luma circuit and a blending circuit. The scaling circuit may be configured to generate a plurality of scaled frames in response to a first plurality of frames generated by a sensor. The first plurality of frames may have a first exposure. The luma circuit may be configured to generate an average luminance value for each of a second of the plurality of frames generated by the sensor. The second of the plurality of frames may have a second exposure. The blending circuit may be configured to generate a plurality of blended frames. The blended frames may be generated in response to (i) one of the scaled frames, (ii) one of the second frames, and (iii) one of the average luminance values. Each of the blended frames may emphasize a portion of the first frame and a different portion of the second frame. The plurality of blended frames may comprise a video sequence.

The objects, features and advantages of the present invention include providing an image processing system that may (i) provide HDR processing to a video sequence, (ii) provide HDR processing at the CFA level and/or (iii) provide an economical implementation for implementing HDR processing.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
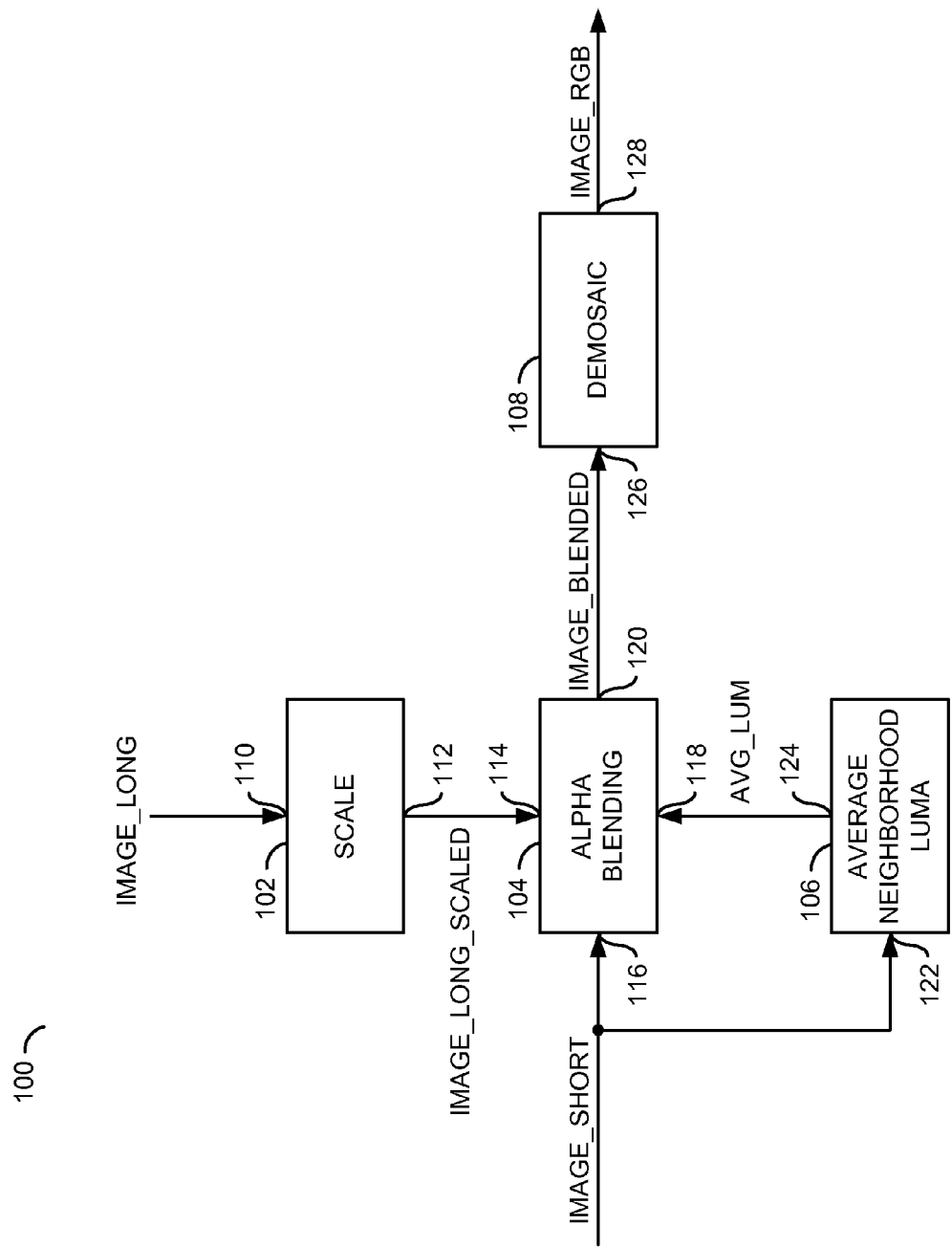
FIG. 1 is a block diagram of the present invention.

Referring to FIG. 1, a block diagram of a system 100 is shown in accordance with a preferred embodiment of the present invention. In one example, the system 100 may be implemented as an integrated circuit (IC). In another example, the system 100 may be implemented as more than one integrated circuit. The circuit 100 may be used to implement high dynamic range (HDR) image fusion processing in a video environment.

The system 100 generally comprises a block (or circuit) 102, a block (or circuit) 104, a block (or circuit) 106, and a block (or circuit) 108. The circuit 102 may be implemented as a scaling circuit. The circuit 104 may be implemented as an alpha blending circuit. The circuit 106 may be implemented as an average neighborhood luma circuit. The circuit 108 may be implemented as a demosaic circuit.

The circuit 102 may have an input 110 that may receive a signal (e.g., IMAGE_LONG) and an output 112 that may present a signal (e.g., IMAGE_LONG_SCALED). The circuit 102 may provide scaling of the pixel intensity of the signal IMAGE_LONG. For example, a short exposure image signal IMAGE_SHORT tends to be noisy in the darker (e.g., low pixel intensity) areas of the image. By scaling the signal IMAGE_LONG, the pixel intensity of the signal IMAGE_LONG may be more closely matched to the pixel intensity of the signal IMAGE_SHORT in the darker areas. The signal IMAGE_LONG_SCALED normally has greater image detail and lower noise than the signal IMAGE_SHORT in corresponding darker areas. In one example, the pixel intensity of the signal IMAGE_LONG may be divided by a factor of 4. However, other factors may be implemented to meet the design criteria of a particular implementation. The signal IMAGE_LONG and the signal IMAGE_SHORT may represent a series of frames generated by an image sensor (to be described in more detail in connection with FIG. 2).

The circuit 104 may have an input 114 that may receive the signal IMAGE_LONG_SCALED, an input 116 that may receive the signal IMAGE_SHORT, an input 118 that may receive a signal (e.g., AVG_LiJM) and an output 120 that may present a signal (e.g., IMAGE_BLENDED). The circuit 106 may have an input 122 that may receive the signal IMAGE_SHORT and an output 124 that may present the signal AVG_LUM. The circuit 108 may have an input 126 that may receive the signal IMAGE_BLENDED and an output 128 that may present a signal (e.g., IMAGE_RGB).

The signal IMAGE_LONG may be a series of long exposure frames. The frames of the signal IMAGE_LONG may be generated using a Color Filter Array (CFA) approach. However, other approaches may be implemented to meet the design criteria of a particular implementation. The signal IMAGE_SHORT may be a series of short exposure frames. The frames of the signal IMAGE_SHORT may be generated using a CFA approach. However, other approaches may be implemented to meet the design criteria of a particular implementation. The signal IMAGE_BLENDED may be a series of blended images. The frames of the signal IMAGE_BLENDED may be high dynamic range images in CFA format. The signal IMAGE_RGB may be an output signal. The signal IMAGE_RGB may be a series of frames that make a video signal. The frames of the signal IMAGE_RGB may be in a format suitable for presentation by a display device. In one example, the signal IMAGE_RGB may be implemented as a signal in an RGB format. However, other formats may be implemented to make the design criteria of a particular implementation. For example, the signal IMAGE_RGB may be in an uncompressed format suitable for presentation by a display device.

In one example, the circuit 108 may be implemented as part of an integrated circuit that includes the circuit 102, the circuit 104 and the circuit 106. In another example, the circuit 108 may be implemented as a separate integrated circuit from the circuit 102, the circuit 104 and the circuit 106. In one example, the signal IMAGE_BLENDED may be presented to an external device (e.g., a computer, handheld display device, etc.). Such an external device may provide a demosaic hardware or software process as a post recording step.

The particular type of HDR processing implemented by the system 100 may be varied to meet the design criteria of a particular implementation. For example, exposure fusion, HDR tone mapping, or other HDR techniques may be implemented. Exposure fusion may be used to combine a set of differently exposed LDR images in such a way that highlight details are taken from the underexposed photos and shadow details are taken from the overexposed photos. The bit-depth does not change throughout the exposure fusion process. The exposure fusion process may provide a type of weighted average of the source images. One of the advantages of exposure fusion is noise reduction. Exposure fusion may be used to implement HDR with multiple exposures.

In a still camera system, exposure fusion may be performed after shooting multiple conventional camera snapshots. Software may be used to perform the merge processing of those images to produce the final image. For a real-time video system, a more efficient 'up-front' processing technique may be implemented. The fusion of two exposures may be implemented in the color filter array (CFA, or Bayer) domain.

HDR tone mapping may be implemented using two steps. The first step creates a high bit-depth (typically 32 bits) HDR image from the set of differently exposed LDR photos. Such an HDR image does not display correctly on a low dynamic range monitor, which is why a second step called tone mapping is implemented. Tone mapping scales each pixel of the HDR image, converting the tonal values of an image from a high range to a lower one. For instance, an HDR image with a dynamic range of 100,000:1 will be converted into an image with tonal values ranging from 1 to 255. The goal of tone mapping is to reproduce the appearance of details in highlights and shadows to show correctly on monitors and prints. Those details are available in the HDR image, but are not directly visible in both highlights and shadows because of the low dynamic range of the display. In that sense, tone mapping has the same purpose as blending exposures.

In one example, the system 100 may implement an exposure fusion method to implement High Dynamic Range (HDR) processing. The fusion of two exposures of an image may be implemented 'up-front' in the color filter array (CFA) (or Bayer) domain. In a basic example having two exposures, a camera sensor may capture long exposures (e.g., frames from the signal IMAGE_LONG) and short exposures (e.g., frames from the signal IMAGE_SHORT). The system 100 may interleave frames of the signal IMAGE_LONG and frames of the signal IMAGE_SHORT in an alternating sequence at the real-time video frame rate (e.g., 15 frames per second, 20 frames per second, 30 frames per second, 60 frames per second, etc.).

During one video frame period, a long exposure raw CFA image is generally captured from a sensor as the signal IMAGE_LONG. In one example, the signal IMAGE_LONG may emphasize dark portions of the video frame. In general, bright areas of the signal IMAGE_LONG may be susceptible to saturation during a long exposure. The long exposure raw image may undergo only minor CFA domain filtering operations at the front-end of the camera image pipeline before being stored to an external memory. In the next alternating video frame period, a short exposure raw CFA image is generally captured from the sensor as the signal IMAGE_SHORT. In one example, the signal IMAGE_SHORT may emphasize bright portions of the video frame. In general, dark areas of the signal IMAGE_SHORT may be more difficult to measure during a short exposure. The frame of the signal IMAGE_SHORT may be stored in the external memory without processing. Alternately, the short exposure raw image may also have one or more minor CFA domain filtering operations performed before entering the alpha blending block 104.

The short exposure image IMAGE_SHORT may enter the average neighborhood luma block 122 where a local neighborhood average luminance value AVG_LUM is calculated for each pixel location. The long exposure CFA image signal IMAGE_LONG, which was captured and stored in the previous frame period, is streamed in from external memory. The signal IMAGE_LONG may undergo an exposure scale factor before feeding into the alpha blending block 104. The scale block 102 may apply simple processing (e.g., a division or bit-shifting by a constant factor) to the long exposure CFA image signal IMAGE_LONG streamed in from the external memory. The scale block 102 may be used to match the mid-tone luminance of the frame of the signal IMAGE_SHORT with the mid-tone luminance of the frame of the signal IMAGE_LONG before blending the two frames together.

Figure 2:
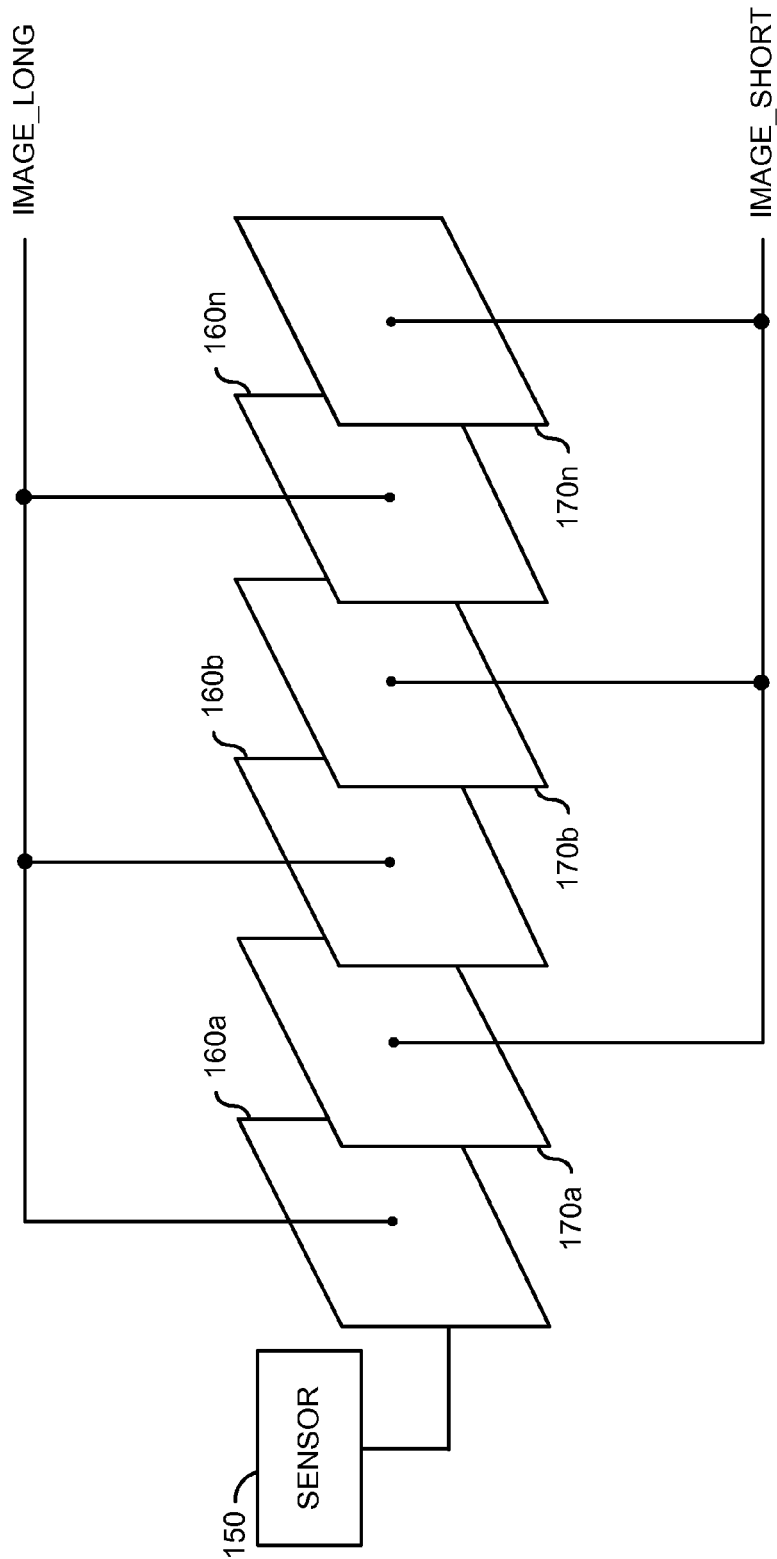
FIG. 2 is a block diagram of an image sensor illustrating the alternating sequence of images.

Referring to FIG. 2, an example of a sensor 150 is shown. The sensor 150 may generate the signal IMAGE_LONG and the signal IMAGE_SHORT. The signal IMAGE_LONG generally comprises a number of frames 160a-160n. The frames 160a-160n may be a number of bright (or long) exposure frames. The signal IMAGE_SHORT generally comprises a number of frames 170a-170n. The frames 170a-170n may be a number of dark (or short) exposure frames. The signal IMAGE_LONG and the signal IMAGE_SHORT may represent a series of frames generated by the sensor 150. The sensor 150 may alternately generate the frames 160a-160n and the frames 170a-170n to create a series of frames. For example, a series of frames generated by the sensor 150 may comprise a first frame 160a, a second frame 170a, a third frame 160b, a fourth frame 170b, etc.

The exposure duration of one of the frames of the signal IMAGE_LONG and the signal IMAGE_SHORT is generally less than the frame period of the signal IMAGE_RGB. For example, if the signal IMAGE_RGB represents a 60 frame per second signal, then the exposure of one of the frames of the signal IMAGE_LONG and one of the frames of the signal IMAGE_SHORT would normally be less than 1/60th of a second. For example, the period of an RGB frame may be the period of one of the long frames plus the period of one of the short frames plus twice the sensor readout period (e.g., ½ ms+8 ms+2*4 ms=16.5 ms=1/60 sec). If the signal IMAGE_RGB has an alternate frame rate (e.g., 24 FPS, 30 FPS, etc.) then the exposure length of the signal IMAGE_LONG and the signal IMAGE_SHORT may be adjusted accordingly. The ranges of exposure for a frame of the signal IMAGE_LONG is generally between 100 µs and 50 sec. The ranges of exposure for a frame of the signal IMAGE_SHORT is generally between 50 µs and 25 sec. In general, a ratio of exposure between a frame of the signal IMAGE_SHORT and the signal IMAGE_LONG is between about 2:1 to about 16:1. However, other ratios may be implemented to meet the design criteria of a particular implementation.

The example described above of the sum of short exposure duration plus the long exposure duration plus the readout period may be considered a general case. However, the sensor 150 may operate slightly differently for a real-time video scenario. For example, the sensors 150 may be implemented to use a "rolling shutter" mode, where particular horizontal lines of pixels may undergo exposure while other horizontal lines of the frame are undergoing a read-out. The read exposure and read-out may occur concurrently, in a generally pipelined fashion. With such an implementation, the shutter 150 may allow more freedom in the choice of exposure durations than the ideal example. For example, if the signal IMAGE_RGB represent a 60 frame per second video signal, then the duration of the signal IMAGE_LONG may be in the range of 1/120 of a second and the duration of the signal IMAGE_SHORT may be in the range of 1/480 of a second. The sensor 150 may be configured to have read-out rate fast enough to transfer two entire image frames of pixels every 1/60 second. The read out times of the sensor 150 may also accommodate time needed to reconfigure the sensor 150 between generating a frame of the signal IMAGE_SHORT and a frame of the signal IMAGE_LONG.

In one example, the frames of the signal IMAGE_LONG may be stored in a temporary memory. In another example, the frames of the signal IMAGE_SHORT may be stored in a temporary memory. The circuit 104 may then blend the stored frames of the signal IMAGE_SHORT with the frames of the signal IMAGE_LONG_SCALE. Once a frame of the signal IMAGE_BLENDED is created, the temporary storage of the frames of the signal IMAGE_SHORT may be discarded. By temporarily storing the frames of the signal IMAGE_SHORT or the frames of the signal IMAGE_LONG, overall system resources may be reduced. In the example where the circuit 100 is implemented as an image processing engine, only the frames of the signal IMAGE_BLENDED or the frames of the signal IMAGE_RGB may need to be presented to circuitry external to the circuit 100.

In one example, a typical operation the scaling factor may be set to be equal to the ratio of the exposure duration of the signal IMAGE_LONG to the exposure duration of the signal IMAGE_SHORT. In some implementations, the scaling factor may not be exactly equal ratio of the exposure durations, but is generally nearly equal to the ratio of exposure durations. Modifying the scaling factor may be used to adjust for non-ideal and/or non-linear behavior of the sensor 150. For example, the pixel values (which are each a value directly proportional to number of photons collected) may not increase exactly linearly with changes in the exposure duration. However, for an ideal sensor 150, the scaling factor may be implemented as the same as the ratio of the exposure of the signal IMAGE_LONG to duration of the exposure of the signal IMAGE_SHORT.

The particular choice of exposure durations used for the signal IMAGE_LONG and the signal IMAGE_SHORT may be varied to meet the design criteria of a particular implementation. In one example, the choice of the exposure durations may be changed dynamically to best suit particular scene conditions. In another example, the exposed durations may be selected manually by the camera operator to suit specific visual preferences. In one example, the exposure duration may be automatically determined by an automatic exposure process configured to provide a generally preferred result.

The signal IMAGE_LONG and the signal IMAGE_SHORT may be separate images physically generated by the sensor 150. The scaling factor is generally used to bring the two exposure images to a proper pixel intensity alignment. Consider a typical example of a 12-bit image received from the sensor 150 (e.g., a 12-bit long exposure image and a 12-bit short exposure image). In such an example, the long exposure duration may be four times longer than the short exposure. The long exposure image is normally measuring 2 extra bits of scene information at the bottom of the 12-bit range that the short exposure cannot measure. Similarly, the short exposure image is normally measuring 2 extra bits of scene information at the top of the 12-bit range that the long exposure cannot measure. Applying the scale factor of 4 would bring the 10 bits in the middle range of image information common to both exposure images into alignment. The 10 bits of overlapping range are generally blended to take some information from the long exposure and some information from the short exposure (to be described in more detail in connection with FIG. 3 and FIG. 4). In general, the long exposure will have more image detail present and lower noise over the darker (lower pixel value) portion of this 10-bit overlap range. The blending operation will favor picking darker portions from the long exposure to form blended image.

Figure 3:
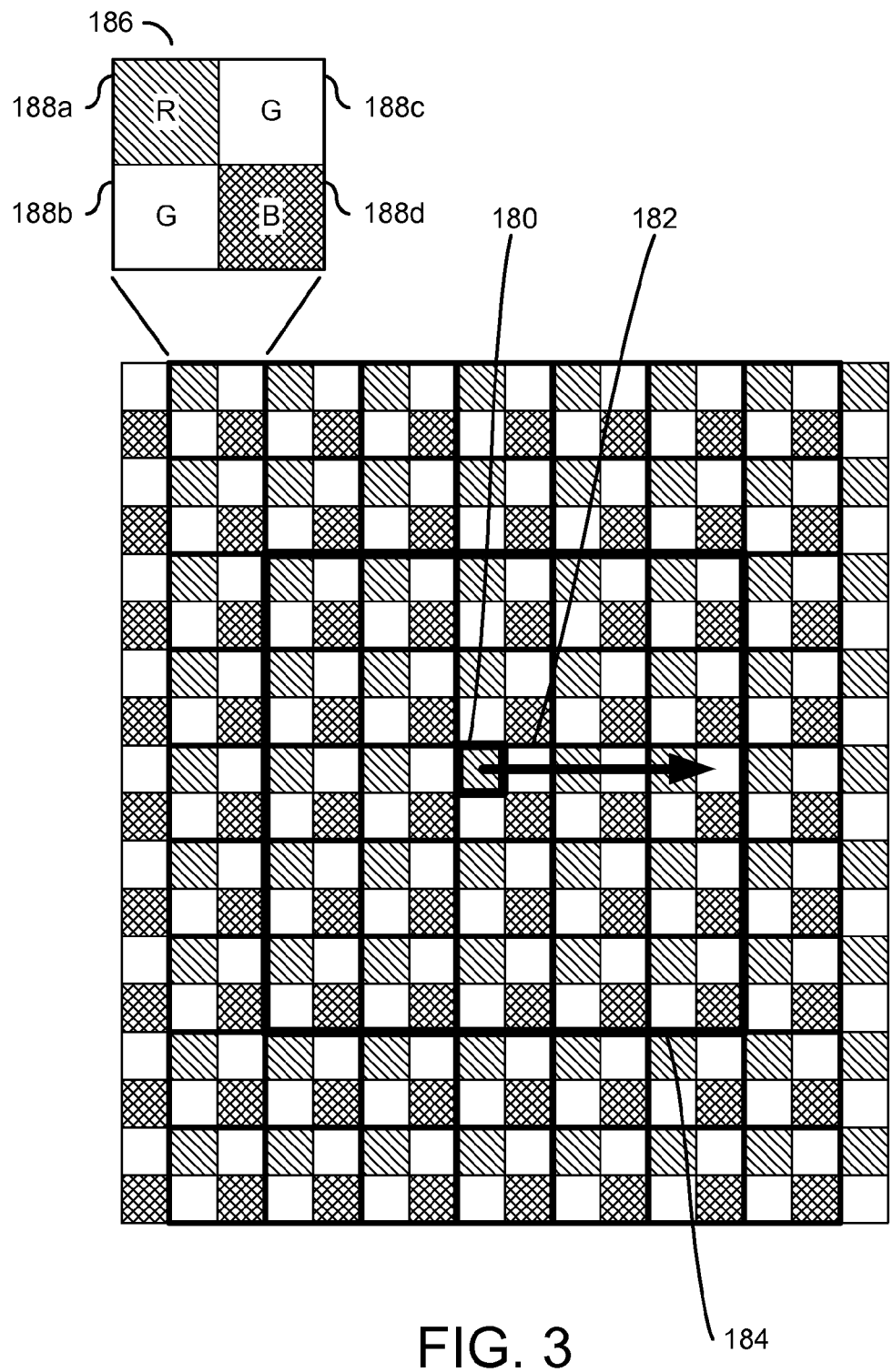
FIG. 3 is internal implementation detail of the average neighborhood luma block.

Referring to FIG. 3, internal implementation detail of the average neighborhood luma block 106 is shown. A current center pixel 180 (e.g., a red Bayer pixel in this example) is shown. The average neighborhood luma block 106 may operate on a neighborhood of Bayer pixels, shown by the outline 184, around the current center Bayer quad 182 being streamed in. The current center Bayer quad 182 may contain the current center pixel 180. The outline 184 indicates a neighborhood with a 'radius' of 5 pixels. In general, a square neighborhood of Bayer pixels is gathered for computation of the signal AVG_LUM. The neighborhood average luma value AVG_LUM may be the summation of all the Bayer pixels in the neighborhood multiplied by a normalization constant. In practical implementation, the neighborhood may not be exactly centered about the center pixel 180, but rather may be rounded to be an even number of Bayer pixels in both height and width. This ensures an integral number of Bayer quads (square groups of four Bayer pixels) in the neighborhood 184, which may ensure that the number of red, blue, and green pixels within the neighborhood remains invariant to the position of the center pixel. Such an implementation also provides efficiency in calculating the neighborhood summation as the current center pixel is advanced to the next adjacent position. The neighborhood summation implies that the luminance is formed with the ratio of 2 green pixels for every 1 red and 1 blue pixel. A blow up of a Bayer quad 186 is shown. A pixel 188a may represent the color red, the pixel 188b may represent the color green, the pixel 188c may represent the color green, the pixel 188d may represent the color blue. Each of the Bayer quads 186 has a similar implementation.

The alpha blending block 104 may blend the scaled previous long exposure image streaming in from external memory together with the current short exposure image streaming down the camera image processing pipeline. The alpha blending block 104 may determine the luminance of each of the Bayer quads 186 within the outline 184. An average of each of the luminances may be used to generate the signal AVG_LUM of each of the particular pixels (e.g., 180). In general, the averaging process is repeated by moving the outline 184 to make the average luminance calculation for each of the pixels.

Figure 4:
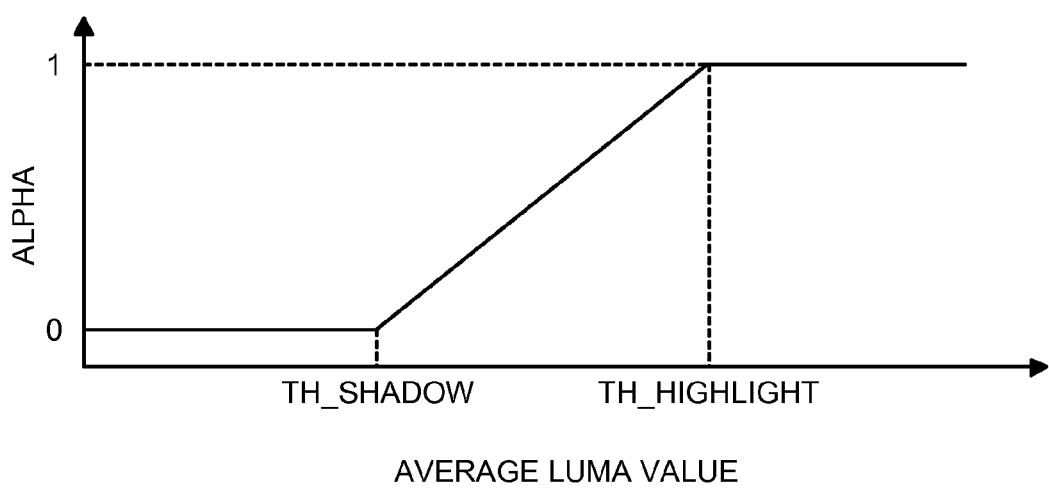
FIG. 4 is a graph of internal implementation detail of the alpha blending block.

Referring to FIG. 4, a graph of the internal implementation detail of the alpha blending block 104 is shown. As shown in FIG. 4, the alpha blending factor may vary according to the computed neighborhood average luma value. A threshold TH_SHADOW may control the blending behavior at the boundary of what is considered shadow areas. The threshold TH_HIGHLIGHT may control the blending behavior at the boundary of what is considered highlight areas. An output blended pixel PIXEL_BLENDED is computed as a function of alpha, the short exposure input pixel PIXEL_SHORT and the long exposure input pixel PIXEL_LONG, according to the following Equation EQ1:

$$PIXEL\_BLENDED = alpha*PIXEL\_SHORT+(1.0-alpha)*(PIXEL\_LONG*Scale)$$

When the neighborhood average luma value is dark, the output picks up from the long exposure. When the neighborhood average luma value is bright, the output picks up from the short exposure. In the mid-tone areas, there is a gradual linear blend of the long and short exposures.

By blending using the alpha value based on a local neighborhood of image pixels, the system 100 may allow the exposure fusion to discriminate regions of shadows (or highlights) in a smoother manner. More contiguous expanses of pixels may be used for blending rather than switching between using isolated pixels from one exposure and adjacent isolated pixels from another exposure. This provides for a less noisy blended image. When a small degree of motion is present between a long exposure capture and a short exposure capture, using the local neighborhood of pixels in the blending also provides for a smoothing effect over the motion areas.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a scaling circuit configured to generate a plurality of scaled frames each having a plurality of pixels with a first exposure in response to a first subset of a plurality of frames generated by a sensor;
   a luma circuit configured to generate an average luminance value for each of a plurality of pixels having a second exposure in each of a second subset of said plurality of frames generated by said sensor; and
   a blending circuit configured to generate a plurality of output frames, wherein (A) each of said pixels of said output frames are selected in response to one of said average luminance values and (B) portions of each of said output frames provide a gradual linear blend between said pixels having said first exposure and said pixels having said second exposure.

2. The apparatus according to claim 1, wherein each pixel of each of said plurality of output frames is generated by selecting (i) one of said pixels having said first exposure from one of said scaled frames or (ii) one of said pixels having said second exposure from one of said second subset of frames.

3. The apparatus according to claim 1, wherein each of said average luminance values is calculated based on a plurality of neighboring pixels in a neighborhood of a current one of said pixels having said second exposure.

4. The apparatus according to claim 3, wherein said plurality of neighboring pixels comprises a Bayer group of pixels.

5. The apparatus according to claim 3, wherein said neighborhood comprises an integral number of said neighboring pixels each having a ratio of two of a first type of pixel for every one of a second type of pixel and one of a third type of pixel.

6. The apparatus according to claim 5, wherein (i) said integral number of said neighboring pixels comprise a pixel quad, (ii) said first type of pixel comprises a green pixel, (iii) said second type of pixel comprises a red pixel and (iv) said third type of pixel comprises a blue pixel.

7. The apparatus according to claim 1, wherein said sensor alternately generates frames comprising one of said first subset of frames and one of said second subset of frames.

8. The apparatus according to claim 1, wherein said first subset of said plurality of frames and said second subset of said plurality of frames are generated in a Color Filter Array (CFA) domain.

9. The apparatus according to claim 1, further comprising:
   a demosaic circuit configured to generate an output signal in response to said plurality of output frames, wherein said output signal comprises a video signal in a format for presentation by a display device.

10. The apparatus according to claim 1, wherein (i) said first exposure is longer than said second exposure and (ii) said first exposure emphasizes bright portions of said first subset of frames and said second exposure emphasizes dark portions of said second subset of frames.

11. The apparatus according to claim 1, wherein said plurality of output frames are implemented in real time.

12. The apparatus according to claim 1, wherein said apparatus is configured to implement high dynamic range image processing.

13. An apparatus comprising:
means for generating a plurality of scaled frames each having a plurality of pixels with a first exposure in response to a first subset of a plurality of frames generated by a sensor;
means for generating an average luminance value for each of a plurality of pixels having a second exposure in each of a second subset of said plurality of frames generated by said sensor; and
means for generating a plurality of output frames, wherein (A) each of said pixels of said output frames are selected in response to one of said average luminance values and (B) portions of each of said output frames provide a gradual linear blend between said pixels having said first exposure and said pixels having said second exposure.

14. A method for implementing high dynamic range image processing, comprising the steps of:
(A) generating a plurality of scaled frames each having a plurality of pixels with a first exposure in response to a first subset of a plurality of frames generated by a sensor;
(B) generating an average luminance value for each of a plurality of pixels having a second exposure in each of a second subset of said plurality of frames generated by said sensor; and
(C) generating a plurality of output frames, wherein (i) each of said pixels of said output frames are selected in response to one of said average luminance values and (ii) portions of each of said output frames provide a gradual linear blend between said pixels having said first exposure and said pixels having said second exposure.

15. The method according to claim 14, wherein said sensor alternately generates frames comprising one of said first subset of frames and one of said second subset of frames.

16. The method according to claim 14, wherein said first subset of said plurality of frames and said second subset of said plurality of frames are generated in a Color Filter Array (CFA) domain.

17. The method according to claim 14, further comprising the step of:
generating an output signal by demosaicing said plurality of output frames, wherein said output signal comprises a video signal in a format for presentation by a display device.

18. The method according to claim 14, wherein (i) said first exposure is longer than said second exposure and (ii) said first exposure emphasizes bright portions of said first subset of frames and said second exposure emphasizes dark portions of said second subset of frames.

19. The method according to claim 14, wherein said plurality of output frames are implemented in real time.

* * * * *